(12) United States Patent
Nishijima et al.

(10) Patent No.: US 6,894,866 B2
(45) Date of Patent: May 17, 2005

(54) RECORDING APPARATUS HAVING IMPROVED ANTI-VIBRATION ARRANGEMENTS

(75) Inventors: Noriyo Nishijima, Chiyoda (JP);
Takashi Kouno, Chiyoda (JP); Isao Kobayashi, Odawara (JP); Hideki Izumida, Ninomiya (JP); Takehiko Eguchi, Mito (JP)

(73) Assignee: Hitachi, Ltd., Tokyo (JP)

( * ) Notice: Subject to any disclaimer, the term of this patent is extended or adjusted under 35 U.S.C. 154(b) by 85 days.

(21) Appl. No.: 10/124,295

(22) Filed: Apr. 18, 2002

(65) Prior Publication Data

US 2003/0058574 A1 Mar. 27, 2003

(30) Foreign Application Priority Data

Sep. 25, 2001 (JP) ........................................ 2001-291706

(51) Int. Cl.$^7$ ............................................... G11B 33/14
(52) U.S. Cl. .................................................... 360/97.02
(58) Field of Search .......................... 360/97.02, 97.01, 360/97.03, 97.04

(56) References Cited

U.S. PATENT DOCUMENTS

| | | | | |
|---|---|---|---|---|
| 5,541,791 A | * | 7/1996 | Yamasaki et al. | 360/256.1 |
| 6,351,344 B1 | * | 2/2002 | Krum et al. | 360/97.01 |
| 6,493,180 B1 | * | 12/2002 | Kang et al. | 360/97.02 |
| 6,529,345 B1 | * | 3/2003 | Butler et al. | 360/97.01 |
| 6,542,328 B2 | * | 4/2003 | Harrison et al. | 360/97.03 |
| 6,560,192 B1 | * | 5/2003 | Bonn et al. | 369/291 |

FOREIGN PATENT DOCUMENTS

| | | |
|---|---|---|
| JP | A-2000-331460 | 11/2000 |
| JP | A-2001-167554 | 6/2001 |

OTHER PUBLICATIONS

IEEE Transactions on Magnetics, vol. 35, No. 5, (1999) P2301–2303.

* cited by examiner

Primary Examiner—Angel Castro
(74) Attorney, Agent, or Firm—Antonelli, Terry, Stout & Kraus, LLP

(57) ABSTRACT

In a recording apparatus capable of reducing an airflow and disturbance of the air flow simultaneously, thereby reducing flutter vibration effectively, a cover includes first convex sections for reducing a size of a gap between a disk surface and a cover or between the disk surface and a housing in an area outside of an area in which an arm traverses on a disk in comparison with the area in which the arm traverses, and a second convex section on a part of the first convex sections to further reduce the size of the gap, and the second convex section is provided in a range extending with a tan shape thereof in a reverse rotational direction of said disk from a position distant by 110–170° in the reverse rotational direction from a straight line connecting the rotational shaft of said disk and the rotational shaft of said arm.

24 Claims, 8 Drawing Sheets

RECORDING APPARATUS HAVING IMPROVED ANTI-VIBRATION ARRANGEMENTS

BACKGROUND OF THE INVENTION AND RELATED ART STATEMENT

The present invention relates to a recording apparatus such as a magnetic disk apparatus or the like, in which a rotary disk-shaped recording medium is used, and more particularly, to a recording apparatus having a structure for reducing vibration of the recording medium caused by rotation.

A conventional recording apparatus, for example, a magnetic disk apparatus is generally constructed of a rotary disk-shaped recording medium, an arm provided with a head to read/write from/to this recording medium placed at the end, an actuator to move the head to a predetermined position, a housing to house these components, a control apparatus and an input/output system. It is known of a magnetic disk apparatus that an air flow is created inside the casing by a rotating disk and vibration of the disk called "flutter" occurs due to disturbance of the air flow. When the disk vibrates, the relative positions of the disk and head change, resulting in a problem that the accuracy of reading/writing of information on the disk deteriorates.

One of methods to address this problem is a method of forming in the housing a shroud surrounding and concentric with a disk as described in IEEE TRANSACTION ON MAGNETS, VOL. 35 NO. 5, (1999) PAGE 2301–2303. According to this method, it is possible to suppress input/output of air on the upper side and under side of the disk by providing a shroud and reducing the size of the gap between the shroud and disk and thereby reduce generation of a cyclic secondary flow on the circumferential area of the disk surface and reduce flutter vibration.

Secondly, as described in JP-A-2000-331460 specification, there is another method of placing and fixing a squeeze air bearing plate having a partially ring-shaped smooth surface spreading in the circumferential direction and in the direction of the radius on one side of the disk facing the disk surface with a gap of 0.3 mm or less in between. This method causes a squeeze attenuating force of an air film to act on the disk surface by sufficiently reducing the distance between the disk surface and squeeze air bearing plate to forcibly reduce flutter vibration.

Thirdly, as described in JP-A-2001-167554 specification, there is a method of adopting a two-stage structure of projections and depressions of a cover of a magnetic disk apparatus and narrowing the gap between the cover and disk in the section outside the area in which the arm on the magnetic disk surface traverses compared to the section corresponding to the area in which the arm on the magnetic disk surface traverses. This method suppresses an air flow generated in the gap and reduces fluttering of the magnetic disk.

OBJECT AND SUMMARY OF THE INVENTION

There is recently a demand that a magnetic disk apparatus should increase recording density and shorten an access time, which in turn requires a reduction of track pitch on a magnetic disk and an increase of the rotational speed of a recording medium. As the access time becomes shorter, the rotational speed of a disk is increased to 10000 rpm or above. However, flutter vibration is approximately proportional to the square of the disk rotational speed, the reading/writing accuracy deteriorates due to flutter vibration as described above, which prevents the track pitch from being reduced. Flutter vibration is vibration of a disk caused by a non-stationary aerodynamic force. Reducing flutter vibration requires the air flow on the disk surface to be suppressed, disturbance or variation of a cyclic secondary flow or circumferential flow generated in the vicinity of the shroud around the disk to be reduced or flutter vibration itself to be forcibly attenuated.

However, in the first method (method of reducing the size of the gap between shrouds), the magnetic disk apparatus needs to have an arm with a head placed at the end inserted on the disk surface and no shroud can be provided over the range in which the arm traverses on the disk surface. Therefore, reducing the gap between the shroud and disk limits the effect of reducing cyclic secondary flow due to input/output of an air flow on the upper side and under side of the disk. Moreover, even if a cyclic secondary flow on the upper side and under side of the disk can be suppressed, the circumferential air flow is not suppressed, and therefore it is not possible to reduce flutter vibration caused by disturbance that occurs when the flow in the disk circumferential direction hits the arm, etc. For these reasons, the flutter vibration reducing effect is limited.

On the other hand, the second method (method of placing or fixing a squeeze air bearing plate facing the disk surface with a gap of 0.3 mm or less in between) forcibly reduces disk vibration by a squeeze attenuating force, but in order to achieve the squeeze effect, it is necessary to place or fix a squeeze air bearing plate with extremely high dimensional accuracy to place/fix it with a gap of 0.3 mm or less, requiring an enormous effort from the standpoint of working accuracy, ease of assembly and shock resistance.

Furthermore, according to the third method (method of adopting a two-stage structure of projections and depressions of a cover of a magnetic disk and narrowing as much as possible the gap between the disk and cover corresponding to the area outside the area where the arm on the magnetic disk surface traverses compared to the area where the arm traverses), narrowing the gap produces a large height difference in the gap between the disk and cover on the boundary between the area where the arm transverses and the other area. Thus, even if the air flow between the disk and cover can be controlled, this height difference produces large disturbance of air flow, resulting in a problem that even if the gap is narrowed, the height difference increases and it is not possible to reduce flutter vibration.

As described above, the conventional methods involve problems that it is not possible to reduce the circumferential air flow or reduce disturbance of the air flow, or that forcibly attenuating the disturbance requires enormous effort from the standpoint of working accuracy, ease of assembly and shock resistance.

It is an object of the present invention to provide a recording apparatus capable of facilitating manufacturing, reducing the air flow and disturbance of the air flow simultaneously and thereby reducing flutter vibration effectively.

(1) In order to attain the above-described object, according to the present invention, a recording apparatus comprises at least one disk whose central shaft is fixed to a rotation shaft, a head movable on a surface of said disk to write information onto the disk or read the information recorded on the disk, an arm supporting the head, an actuator for moving the arm, a shroud section shrouding, with an arc-shape thereof concentric with the disk, the disk within a movable range of the arm, a housing receiving therein said disk, said arm and said actuator, and a cover covering said housing, a first convex section is provided to reduce a size of a gap between said disk surface and said cover or between said disk surface and said housing in an area outside an area in which the arm traverses on said disk, in comparison with the area in which the arm traverses, a second convex section is provided on a part of the first convex section to further reduce the size of the gap between the disk surface and said cover or between said disk surface and said housing in comparison with the first convex section, and said second convex section is provided in a range extending with a fan shape thereof in a reverse rotational direction of said disk from a position distant by 110–170° in the reverse rotational direction from a straight line connecting the rotational shaft of said disk and the rotational shaft of said arm.

Such a configuration can facilitate manufacturing, reduce the air flow and disturbance of the air flow simultaneously and can thereby reduce flutter vibration effectively.

(2) In the above-described item (1), it is preferable that said second convex section has an upstream part in a rotational direction of said disk, and the upstream part is inclined in the rotational direction with respect to a straight line connecting a rotational center of said disk and a front end of said convex section on an upstream side in the rotational direction.

(3) In order to attain the above object, according to the present invention, a recording apparatus comprises:

at least one disk whose central shaft is fixed to a rotation shaft; a head movable on a surface of said disk to write information onto said disk or read information recorded on the disk or; an arm supporting the head; an actuator for moving the arm; a shroud section shrouding, with an arc-shape thereof concentric with the disk, the disk within a movable range of the arm; a housing receiving therein said disk, said arm and said actuator; and a cover covering said housing, a first convex section is provided to reduce a size of a gap between said disk surface and said cover or between said disk surface and said housing in an area outside of an area in which the arm traverses on said disk, in comparison with the area in which the arm traverses, a second convex section is provided on a part of the first convex section to further reduce the size of the gap between the disk surface and said cover or between said disk surface and said housing in comparison with the first convex section, and an end of said second convex section at a downstream side in the rotational direction of the disk is provided within a range extending by ±30° from a position on an opposite side with respect to said head as seen from said rotation axis.

Such a configuration can facilitate manufacturing, reduce the air flow and disturbance of the air flow simultaneously and can thereby reduce flutter vibration effectively.

(4) In the above-described item (3), it is preferable that said second convex section has an upstream part in a rotational direction of said disk, and the upstream part is inclined in the rotational direction with respect to a straight line connecting a rotational center of said disk and a front end of said convex section on an upstream side in the rotational direction.

(5) In order to attain the above object, according to the present invention, a recording apparatus comprises: at least one disk whose central shaft is fixed to a rotation shaft; a head movable on a surface of said disk to write information onto the disk or read the information recorded on the disk; an arm supporting the head; an actuator for moving the arm; a shroud section shrouding, with an arc-shape thereof concentric with the disk, the disk within a movable range of the arm; a housing receiving therein said disk, said arm and said actuator; and a cover covering said housing, a convex section is provided at an opposite side, as seen from said rotation axis, with respect to an area in which the arm traverses on said disk to reduce a size of a gap between said disk surface and said cover or between said disk surface and said housing, and said convex section is provided in a range extending with a fan shape thereof in a reverse rotational direction of said disk from a position distant by 110–170° in the reverse rotational direction from a straight line connecting the rotational shaft of said disk and the rotational shaft of said arm.

Such a configuration can facilitate manufacturing, reduce the air flow and disturbance of the air flow simultaneously and can thereby reduce flutter vibration effectively.

(6) In the above-described item (5), it is preferable that said second convex section has an upstream part in a rotational direction of said disk, and the upstream part is inclined in the rotational direction with respect to a straight line connecting a rotational center of said disk and a front end of said convex section on an upstream side in the rotational direction.

(7) In order to attain the above object, according to the present invention, a recording apparatus comprises: at least one disk whose central shaft is fixed to a rotation shaft; a head movable on a surface of said disk to write information onto the disk or read the information recorded on the disk; an arm supporting the head; an actuator for moving the arm; a shroud section shrouding, with an arc-shape thereof concentric with the disk, the disk within a movable range of the arm; a housing receiving therein said disk, said arm and said actuator; and a cover covering said housing, and a protrusion for suppressing separation of the flow is provided in an arc-shaped opening of said shroud.

Such a configuration can facilitate manufacturing, reduce the air flow and disturbance of the air flow simultaneously and can thereby reduce flutter vibration effectively.

Other objects, features and advantages of the invention will become apparent from the following description of the embodiments of the invention taken in conjunction with the accompanying drawings.

DETAILED DESCRIPTION OF PREFERRED EMBODIMENTS OF THE INVENTION

With reference now to FIG. 1 to FIG. 8, a configuration and effects of a recording apparatus according to an embodiment of the present invention will be explained below.

First, a configuration of the recording apparatus according to this embodiment will be explained by using FIG. 1 to FIG. 4.

Figure 1:
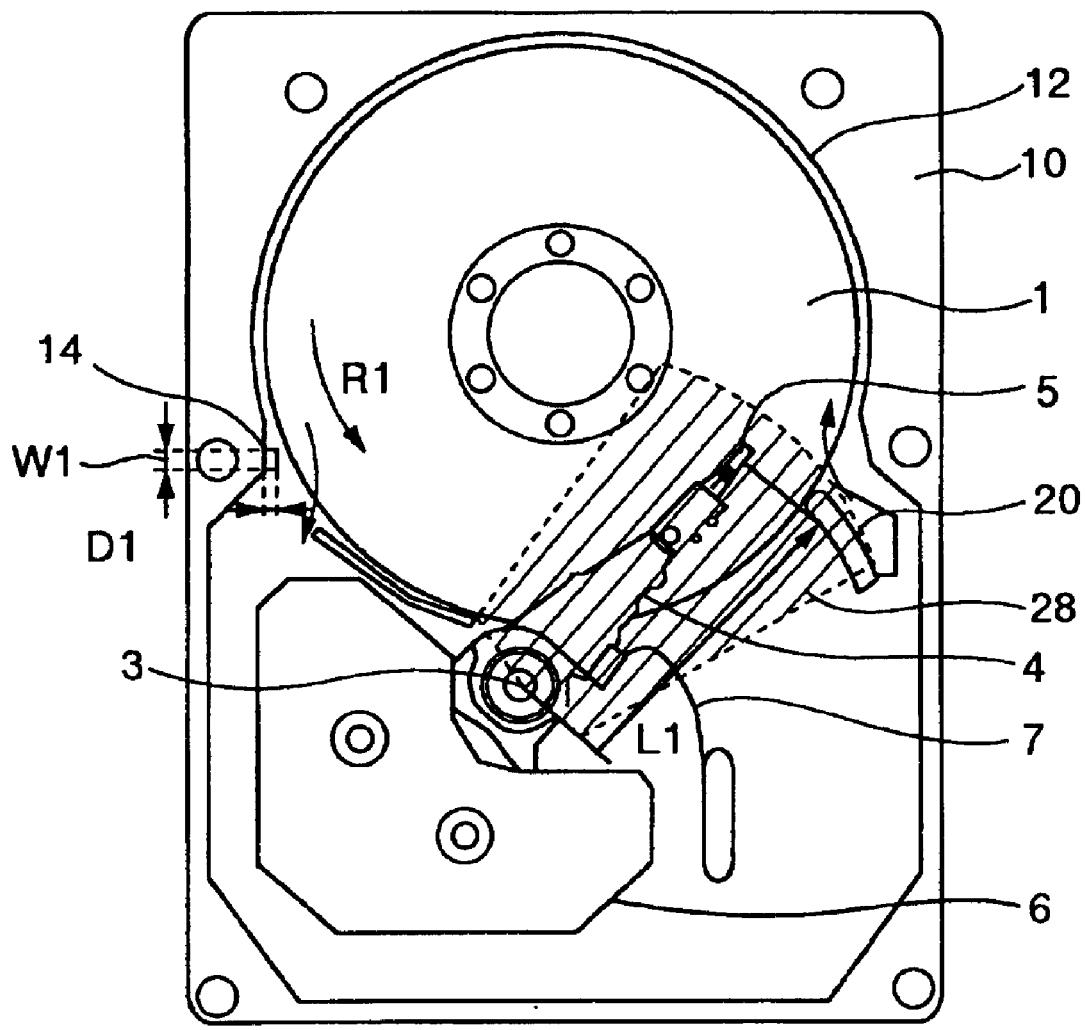
FIG. 1 is a top view of an internal configuration of a housing when a cover is removed in a recording apparatus according to an embodiment of the present invention.
Figure 2:
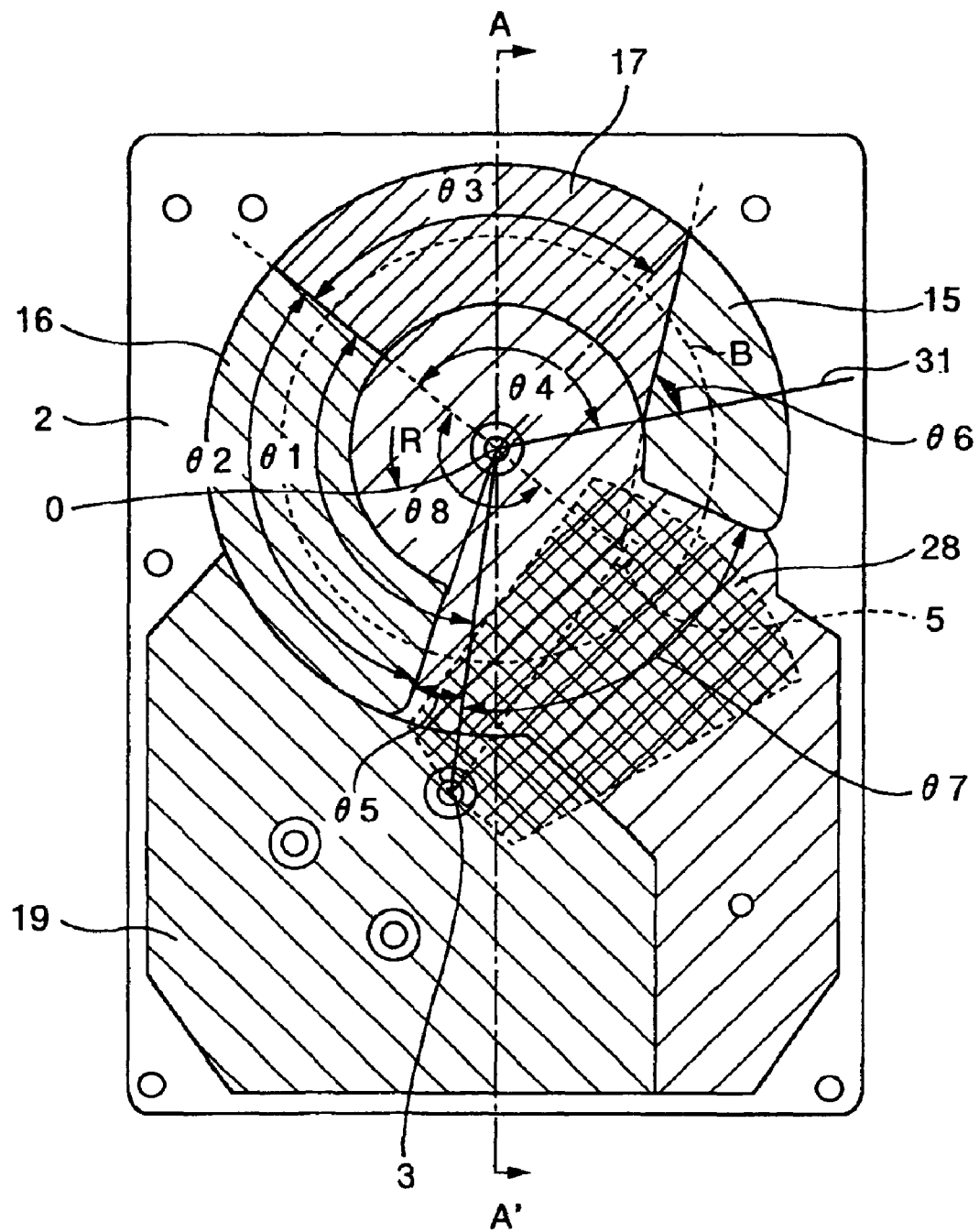
FIG. 2 is a top view showing an outlined configuration of the recording apparatus according to the embodiment of the present invention when the cover is attached.
Figure 3:
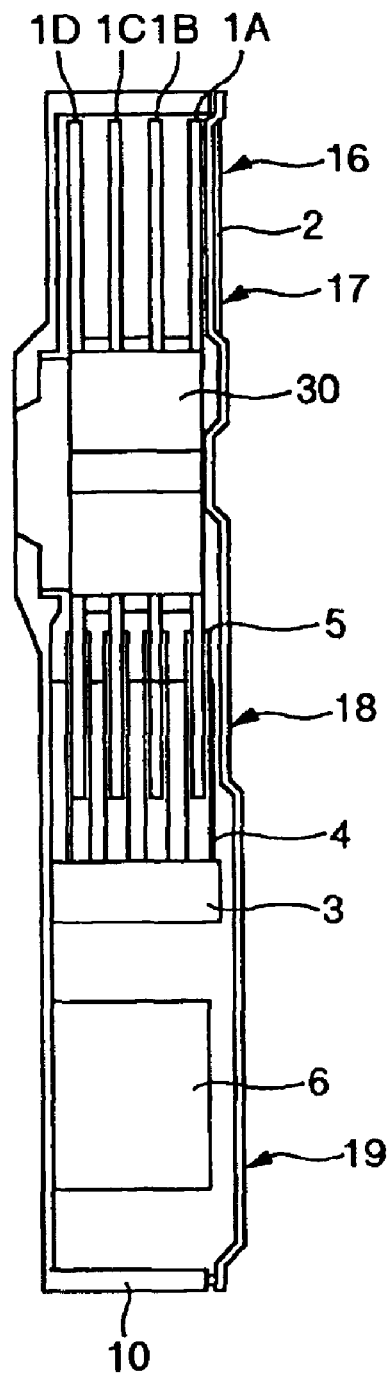
FIG. 3 is a cross sectional view taken along a line of A–A' in FIG. 2.
Figure 4:
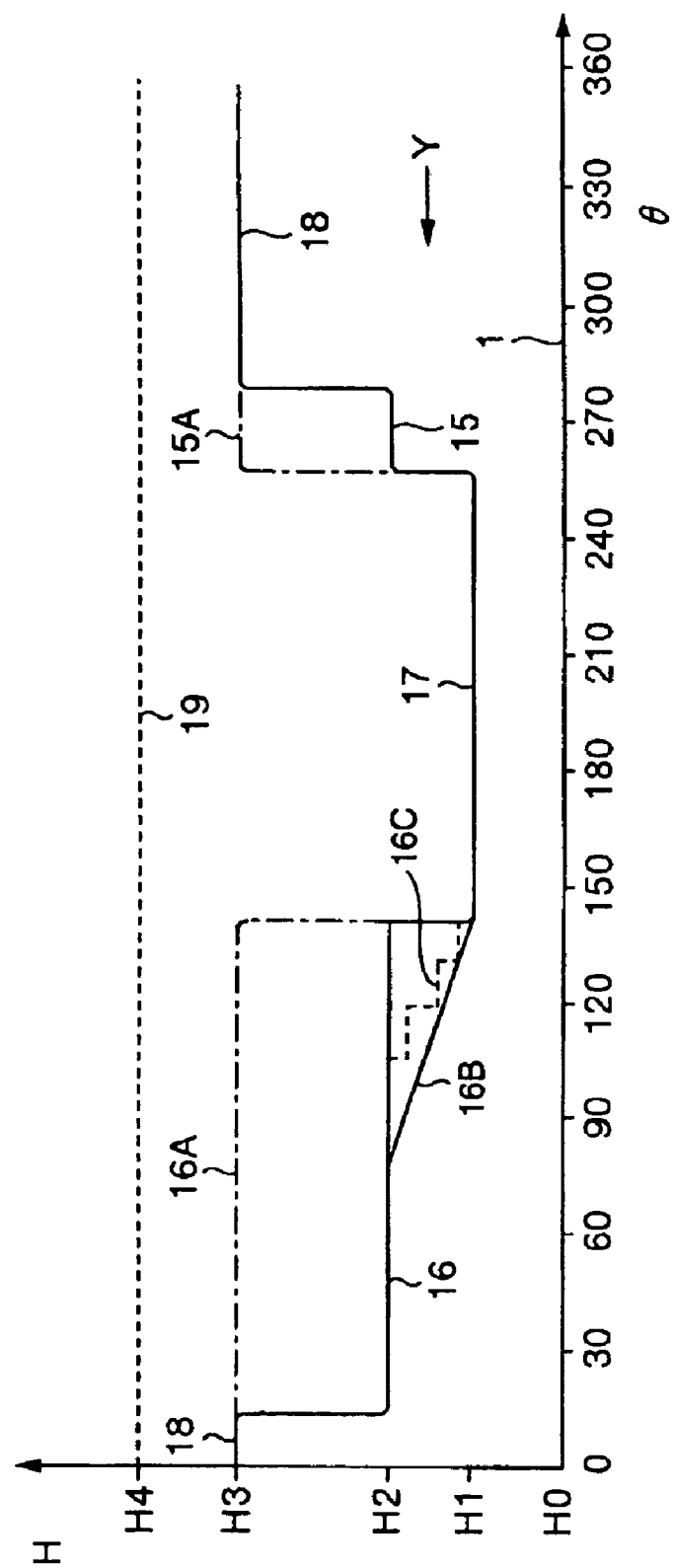
FIG. 4 is a cross sectional development view taken along a dotted line B in FIG. 2.

FIG. 1 is a top view of an internal configuration of a housing when a cover of the recording apparatus according to an embodiment of the present invention is removed. FIG. 2 is a top view showing an outlined configuration of the recording apparatus according to an embodiment of the present invention when the cover is attached. FIG. 3 is a cross sectional view taken along A–A' in FIG. 2. FIG. 4 is a cross sectional development view taken along a dotted line B in FIG. 2.

As shown in FIG. 1, the magnetic disk apparatus is provided with a disk 1 which is a rotary disk-shaped recording medium, an arm 4 with a head 5 for reading/writing from/to the disk 1 placed at the end, an actuator 6 for moving the head 5 to a predetermined position, and a housing 10 receiving therein these components.

The disk 1 for recording information therein is rotated in a disk rotational direction R1 by a motor 30 which will be described later in FIG. 3. An interior of the housing 10 is closed by a cover 2 which will be described later in FIG. 3. On a part of the housing 10, a shroud 12 with an arc shape which is concentric with the disk 1 and has a diameter slightly greater than an outer diameter of the disk 1 is formed. The head 5 for reading/writing the information from/to the disk 1 is fixed to the vicinity of one end of the arm 4. Another end of the arm 4 is supported on the housing 10 by an arm rotation shaft 3 for rotating the arm 4. The arm 4 is swung around the arm rotation shaft 3 by an actuator 6 to move the head 5 to a desired position. When stopped, the head 5 is positioned on a ramp 20 by moving the arm 4 outward with respect to the disk. The arm 4 and head 5 move within an arm moving range 28 indicated by hatching where the arm traverses to read/write information on the disk 1 or position the head 5 onto the ramp when stopped. Information read/written by the head 5 is transmitted by signal wiring 7. A plurality of the disks 1 may be stacked according to a required amount of information to be recorded and a plurality of the arms 4 and heads 5 may be also provided accordingly.

In the case of a 3.5 inches magnetic disk apparatus, a length L1 of the arm 4 (length from the head 5 to the rotational center of the rotation shaft 3) is substantially constant and is about 45±2 mm. The head 5 performs arc-shaped movement around the rotation shaft 3. To restrain a positional relationship between tracks on the disk 1 and the head 5 (an angle of the head with respect to a track direction) from changing, if the length of the arm 4 is substantially constant, the position of the rotation shaft 3 of the arm 4 with respect to the rotational center of the disk 1 is determined.

As shown in FIG. 1, a protrusion 14 is formed in the opening of the shroud 12, which will be described later.

Then, a projection-and-recess shape of the cover 2 will be describe using FIG. 2 to FIG. 4.

As shown in FIG. 3, on the cover 2, a first area 18, a second area 19, first convex sections 15 and 16 end a second convex section 17 are formed. As shown in FIG. 2, the first convex sections 15 and 16 and the second convex section 17 protrude toward the magnetic disk 1A (toward inside the housing 10: a direction away from a viewer of the drawing sheet and perpendicular to a surface of the drawing sheet) in comparison with a flat surface of the first area 18. As shown in FIG. 3, the amount of protrusion of the second convex section 17 toward the magnetic disk 1A is greater than that of the first convex section 15 and 16 toward the magnetic disk 1A. The amount of protrusion of the first convex section 15 toward the magnetic disk 1A is the same as that of the first convex section 16 toward the magnetic disk 1A. In other words, a distance between the second convex section 17 and the magnetic disk 1A is smaller than a distance between the first convex sections 15 and 16 and the magnetic disk 1A. Furthermore, as shown in FIG. 3. the second area 19 protrudes toward an opposite side of the magnetic disk (toward outside the housing; a direction close toward the viewer of the, drawing sheet and perpendicular to the surface of the drawing sheet) in comparison with the flat surface of the first area 18.

Furthermore, as shown in FIG. 3, the area 18 of the cover 2 shown in FIG. 2 is formed to have a gap of such size that the arm 5 is prevented from contacting the cover 2. The area 18 has the gap of such size that it is prevented from contacting the motor 30 as shown in FIG. 3. Furthermore, the area 19 of the cover 2 shown in FIG. 2 is formed to have a height enough for receiving therein the actuator 6 and arm 5 as shown in FIG. 3 and has a convex shape protruding toward the outside of the housing 10.

That is, according to this embodiment, the cover 2 is provided with the first convex sections 15 and 16 protruding toward the inside of the housing to reduce the size of the gap between the disk surface 1 and the cover 2 in comparison with the range 28 in which the arm 4 traverses and the second convex section 17 protruding toward the inside of the housing to reduce the gap between the disk surface and the cover further in comparison with the first convex section on the opposite side of the range 28 with respect to the disk rotational axis, in which range 28 the arm traverses on the surface of the disk 1. The convex sections 15, 16 and 17 are formed by, for example, pressing process or attaching a plate to the inner surface of the cover.

The ranges where the first convex sections 15 and 16 and the second convex section 17 are provided will be explained using FIG. 2 and FIG. 4.

FIG. 4 is a cross sectional development view showing an important portion of a cross section taken along dot line B in FIG. 2. A horizontal coordinate in FIG. 4 corresponds to an angle from a straight line connecting the rotation axis O of the disk and the rotation axis 3 of the arm as an angle datum line of θ=0° in a reverse rotational direction of the disk 1 (direction opposite to the rotational direction R of the disk 1). A vertical coordinate in FIG. 4 corresponds to a height H of the section 15, 16, 17, 18 or 19 of the cover 2 from the height of the disk 1.

As shown in FIG. 2, the second convex section 17 is provided within a range of a fan-shape expanding in the reverse rotational direction from a position of angle θ1 angularly distant in the reverse rotational direction of the disk from the straight line connecting the rotation axis of the disk and the rotation axis of the arm. For example, θ1=140°. In this case, the upstream side of the second convex section 17 in the rotational direction is formed to be inclined by angle θ6 in the rotational direction (direction indicated by arrow R) with respect to the straight line 31 connecting the rotational center O of the disk 1 and a front end of the second convex section 17 on the upstream side in the rotational direction. As a result, as shown in FIG. 2, in the second convex section 17, a spread angle θ4 is 120° at an inner periphery of the fan shape and a spread angle θ3 is 90° in an outer periphery of the fan shape.

On the other hand, the first convex section 15 is provided within a range of fan-shape extending in the reverse rotational direction of the disk by angle θ2 from a position of θ5 distant from the area 28 where the arm traverses to a position contacting the second convex section 17. If, for example, θ5=13°, then θ2=127°

On the other hand, the first convex section 16 is provided within a range of fan-shape extending in the reverse rotational direction of the disk from a position contacting the second convex section 17 to a position of, for example, θ7=80° distant from the area 28 where the arm traverses.

With regard to these relationships, if the position of θ=0° is considered as a datum position as shown in FIG. 4, the range of θ=0–13° is the area 18 with the height of H3=for example, 2.25 mm from the disk 1. A range of θ=13–140° is the first convex section 15 with the height of H2=for example, 1.25 mm from the disk 1. A range of θ=140–255° is the area 17 with the height of H1=for example, 0.6 mm from the disk 1. An end of the second convex section 17 in the reverse rotational direction of the disk 1 is inclined by angle θ5 as shown in FIG. 2, and so θ=255° is an angle at the position on the dot line B. A range of θ=255–280° is the first convex section 16 with the height of H2=for example, 1.25 mm from the disk 1. A range of θ=280–360° is the area 18 with the height of H3=for example, 2.25 mm from the disk 1. For reference, the height H4 of the area 19 is greater than the height H3 in the area 18 as indicated by a dot line.

A relationship between the shape/position of the second convex section and the flutter amplitude will be explained using FIG. 5 to FIG. 8.

Figure 5:
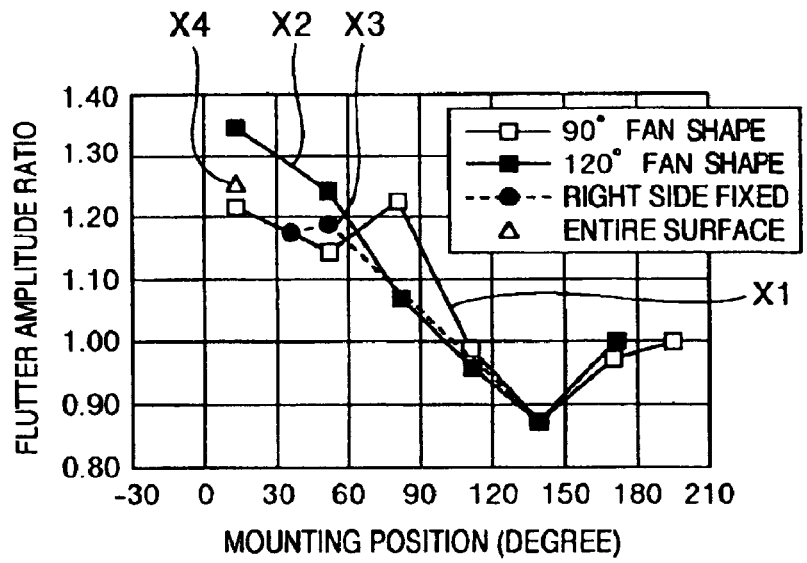
FIG. 5 is a diagram showing a relationship between a shape/position of a second convex section and a flutter amplitude in the recording apparatus according to the embodiment of the present invention.
Figure 6:
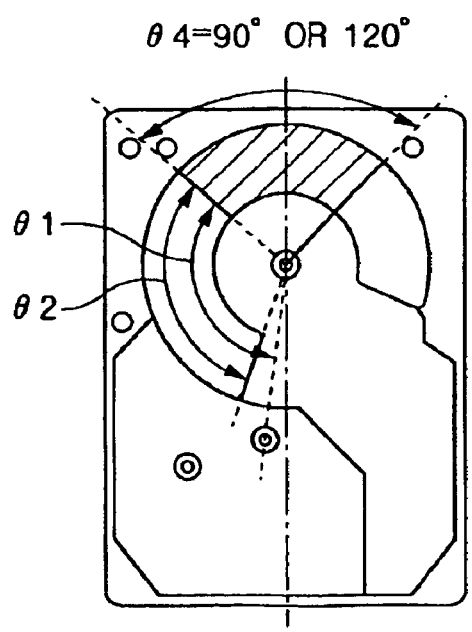
FIG. 6 is a top view showing an experiment condition shown in FIG. 5.
Figure 7:
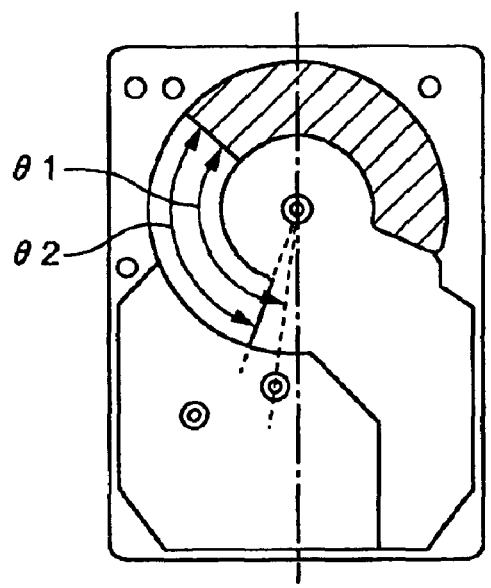
FIG. 7 is a top view showing an experiment condition shown in FIG. 5.
Figure 8:
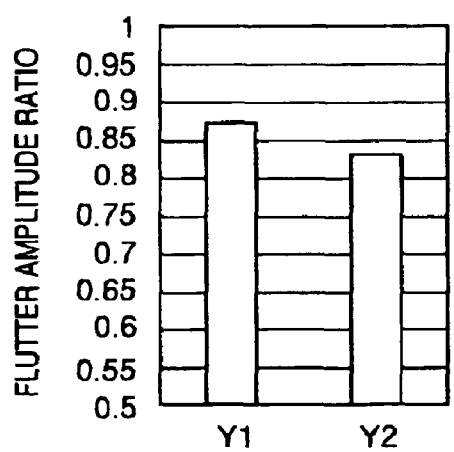
FIG. 8 is a diagram showing an experiment result.

FIG. 5 illustrates a relationship between the shape/position of the second convex section and flutter amplitude in the recording apparatus according to an embodiment of the present invention. FIG. 6 and FIG. 7 illustrate the experiment conditions shown in FIG. 5, and FIG. 8 illustrates the experiment result.

In an experiment apparatus used to obtain the result shown in FIG. 5, five disks with an outside diameter of 84 mm were stacked and rotated at 10000 rpm. The cover 2 is provided with the first convex sections 15 and 16 outside the range 18 in which the arm on the disk surface traverses as shown in FIG. 2 and the second convex section 17 is formed by attaching a fan-shaped plate to the corresponding location on the inner surface of the cover facing to the disk surface. The gap between the first convex sections 15 and 16 and the surface of the disk 1 is 1.25 mm and the gap between the second convex section 17 and the surface of the disk 1 is 0.6 mm. In the experiment, a micro hole was perforated in the cover 2 to allow a laser beam to pass and a laser Doppler flow meter was used to measure the amplitude of vibration on the surface of the disk. Based on the measurement result, the frequency component originated from flutter vibration was extracted to calculate the flutter amplitude.

FIG. 5 shows an experiment result of a relationship between the location of the second convex section 17 on the cover and the flutter vibration. In the diagram shown in FIG. 5, a vertical coordinate corresponds to a non-dimensional flutter amplitude which is set at "1" when the cover includes only the first convex section where the gap between the disk surface and the cover is uniformly reduced to 1.25 mm at the outside of the range in which the arm on the disk surface traverses. A horizontal coordinate corresponds to the angle θ1 shown in FIG. 2.

Data X1 is the flutter amplitude measured with varying angle θ1 when the fan-shaped second convex section of θ4=90° is provided on a part of the cover as shown in FIG. 6. At this time, the upstream side of the second convex section 17 in the rotational direction is prevented from being inclined by angle θ6 in the rotational direction (direction indicated by arrow R) with respect to the connecting straight line 31 as shown in FIG. 2, and the second convex section has θ4=90° at both the inner periphery region and the outer periphery region.

Data X2 is the flutter amplitude measured with varying angle θ1 when the fan-shaped second convex section of θ4=120° is provided likewise.

Data X3 is the flutter amplitude measured with varying the datum angle θ1 of the second convex section at the upstream side of the arm when the boundary of the first convex section is aligned with the boundary of the second convex section at the downstream side of the arm as shown in FIG. 7, that is, there is no equivalent of the first convex section 16 shown in FIG. 2.

Furthermore, data X4 is the flutter amplitude measured without the second convex section when the gap between the first convex section and disk set at 0.6 mm.

As shown above, it is readable from the data X4 that the flutter amplitude deteriorates when the size of the gap between the disk and cover is reduced (distance between the disk and the first convex section is 0.6 mm) with only the first convex section and without the second convex section 17. When the gap between the disk surface and cover is reduced by only the first convex section, the height difference of the first convex section increases to cause large disturbance of the air flow interfering with the arm and thereby increases the flutter amplitude.

On the contrary, when the second convex section 17 is provided (as in the cases of data X1, X2 and X3) as in this embodiment, the flutter amplitude is large when θ1 is small as in the case where the gap is reduced by only the first convex section, but when θ1 increases to become θ1=100 to 110° or more, the flutter amplitude is reduced to a reference value or below. Furthermore, it is known that the flutter amplitude becomes a minimum value near 140° and then increases again. When θ1=170 to 200°, the flutter amplitude decreases below the reference value. That is, it is seen that by setting θ1 at 110° to 170°, without depending on the angle value of the fan-shaped area of the second convex section, it is possible to reduce the flutter amplitude to the reference value or below. Furthermore, by setting θ1 at 140°, regardless of the fan shape, it is possible to minimize the flutter amplitude (flutter amplitude ratio=0.85).

Then, FIG. 8 will be used to explain the effect of inclining the upstream side of the second convex section 17 in the rotational direction of the disk by θ6 in the rotational direction with respect to a straight line connecting the rotational center of the disk and the front end of the convex section on the upstream side in the rotational direction.

In FIG. 8, data Y1 indicates the flutter amplitude when θ1=140° and the fan angle is 120° in FIG. 5. Data Y2 is obtained, in addition to the condition relating to data Y1, when the upstream side in the rotational direction is further inclined by θ6=70° in the rotational direction with respect to the straight line connecting the rotational center of the disk and the front end of the convex section on the upstream side in the rotational direction, and the shape of the second convex section 17 set to θ3=90° and θ4=120° as shown in FIG. 2.

When data Y1 is compared with data Y2, it is seen that inclining the upstream part of the convex section in the rotational direction to the rotational direction can reduce the flutter amplitude by approximately 5% compared to other cases.

In the above explanations, the two first convex sections 15 and 16 and the second convex section 17 different in height from the first convex sections 15 and 16 are formed at the outside of the range 18 in which the arm traverses on the disk surface, but the first convex section 16 needs not always to have any clear height difference from the second convex section 17 adjacent thereto in the rotational direction of the disk. For example, as shown in FIG. 4, a first convex section 16B may be provided so that the gap between the disk surface and the cover changes continuously in the rotational direction of the disk or a first convex section 16C may be provided so that the gap between the disk surface and the cover changes stepwise. In the cases of using the first convex sections 16B and 16C, it is likewise possible to minimize the flutter amplitude ratio by setting a position where the distance between the disk at the downstream side of the second convex section 17 in the rotational direction of the disk and the second convex section 17 becomes smallest, at a position of θ=140° from the straight line connecting the rotation axis O of the disk and the rotation axis 3 of the arm.

According to this embodiment, in the air flow inside the housing, an air flow is generated in a circumferential direction of the disk in the same direction as the rotational direction of the disk on the disk surface in accordance with rotation of the disk. A part of the air flow in the circumferential direction is directed from the upstream side of the arm, that is, from the opening of the shroud at the left side on the drawing sheet in FIG. 1 to the vicinity of the actuator at the lower part of the housing and directed to the disk from the downstream side of the arm, that is, from the opening of the shroud at the right side on the drawing sheet in FIG. 1.

As explained above, when the first convex sections and second convex section are formed in the places different from the range where the arm traverses with respect to the rotation axis of the disk, the first convex section uniformly reduces the size of the gaps other than the range in which the arm traverses on the disk surface, the second convex section is provided to further reduce the size of the gap between the disk surface and the cover or the gap between the disk surface and housing on an opposite side of the range in which the arm traverses on the disk surface with respect to the rotation axis of the disk, and the second convex section is provided in the range of the fan shape extending in the reverse rotational direction from the position distant by 110–170° in the reverse rotational direction of the disk from the straight line connecting the rotation axis of the disk and rotation axis of the arm, it is possible to reduce disturbance of the air flow due to the height difference of the first convex section near the upstream side of the arm so that the flutter vibration is reduced in comparison with the case where the gap is reduced only at the first convex section by the same amount.

Furthermore, in the second convex section, since the upstream side in the rotational direction is inclined in the rotational direction with respect to the straight line connecting the rotational center of the disk and the front end of the second convex section on the upstream side in the rotational direction, the circumferential flow between the disk and the cover is inclined to a radially outward direction of the disk, a flow in the direction of the rotation axis of the disk is forcibly generated in the gap between the shroud and the disk, so that a cyclic secondary flow generated near the shroud in the outer peripheral region of the disk to cause an unstable flow is broken, and reduces flutter vibration. Furthermore, the above-described effect is produced by suppressing disturbance of the air flow and the air flow between the disk surface and the cover and deviating the circumferential air flow, and therefore this effect is also obtained even when the gap between the cover and the disk is about 0.6 mm as shown in the experiment result shown below and it can be easily manufactured.

Furthermore, the above-described embodiment can also be interpreted as follows. That is, in the example shown in FIG. 2, when the positional relationship between the position of the downstream side of the second convex section 17 in the rotational direction of the disk and the head 5 is considered, the second convex section 17 for reducing the size of the gap between the disk surface and the cover or the gap between the disk surface and the housing is formed on an opposite side of the range 28 in which the arm traverses with respect to the disk rotation axis O. That is, the position of the downstream side end of the second convex section in the rotational direction of the disk may also be interpreted as being within a range of ±30° (within a range of θ1=110 to 170° in FIG. 2) from the central position of the range having angle θ8=180° with respect to the head 5 (position of angle θ1=140° in FIG. 2).

Likewise, a configuration and effects of a recording apparatus according to a second embodiment of the present invention will be explained using FIG. 4.

In the configuration shown in FIG. 2, the first convex sections 15 and 16 are provided on both sides of the second convex section 17 in the rotational direction of the disk in addition to the second convex section 17. However, as shown with single-dot dashed line in FIG. 4, the first convex sections 15A and 16A may also be included together with the range 28 by a single convex section having the same height H3 as the hight of the range 28 where the arm traverses. That is, the single convex section 17 may also be formed for the range 28 in which the arm traverses.

At this case, with regard to the position of the convex section 17, it is also possible to reduce the flutter amplitude from the standard by setting θ1 at 110° to 170° and minimize the flutter amplitude (flutter amplitude ratio=0.85) by setting θ1 at 140° regardless of the fan shape.

As explained above, by providing a convex section on the opposite side of the range in which the arm traverses with respect to the rotation axis of the disk and providing this convex section in a range of a fan shape extending in the reverse rotational direction from the position distant by 110° to 170° in the reverse rotational direction of the disk from the straight line connecting the disk rotation axis and the above-described arm rotation axis, it is possible to reduce disturbance of the air flow near the upstream of the arm, resulting in a reduction of flutter vibration.

Then, a configuration and effects of a recording apparatus according to a third embodiment of the present invention will be explained using FIG. 1 and FIG. 9 to FIG. 12.

Figure 9:
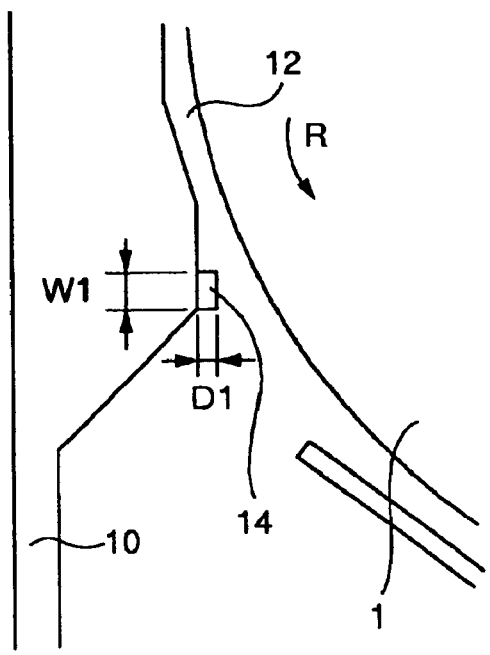
FIG. 9 is an enlarged view showing important portions in a recording apparatus according to a third embodiment of the present invention.
Figure 10:
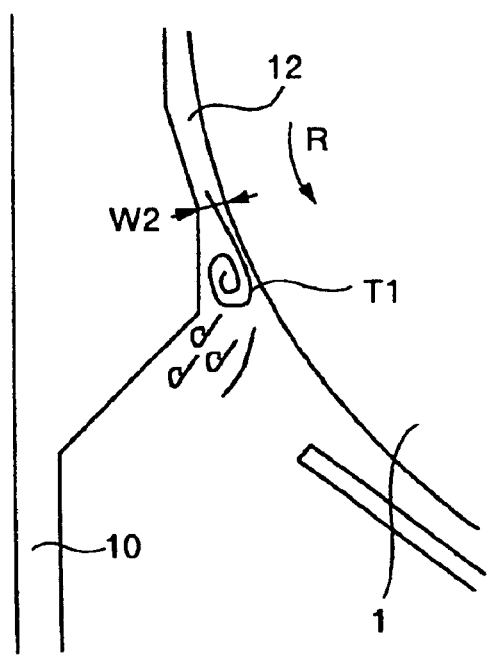
FIG. 10 is an enlarged view showing an air flow at an opening of a shroud.
Figure 11:
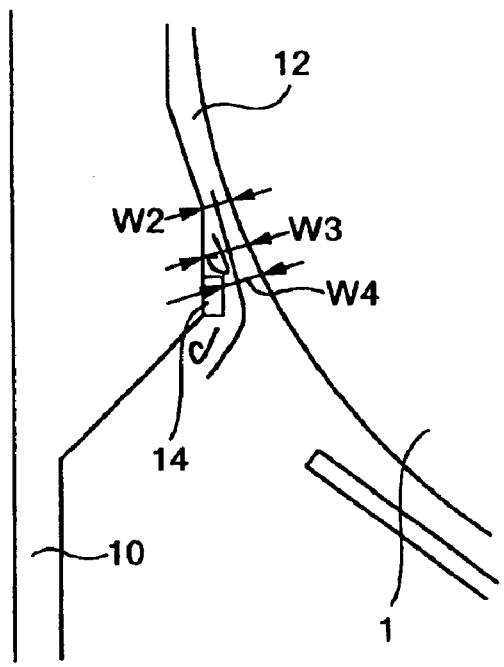
FIG. 11 is an enlarged view showing another air flow at the opening of the shroud.
Figure 12:
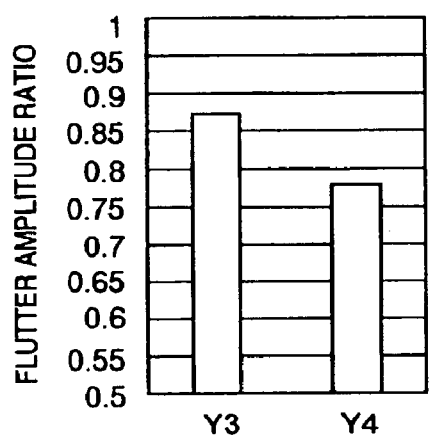
FIG. 12 is a diagram showing an experiment result.

FIG. 9 is an enlarged plan view of main parts of a recording apparatus according to the third embodiment of the present invention. FIG. 10 and FIG. 11 illustrate an air flow at the opening of a shroud. FIG. 12 illustrates an experiment result. The same reference numerals in FIG. 9 to FIG. 11 as those in FIG. 1 denote the same parts.

As shown in FIG. 1, In this embodiment, a protrusion 14 is formed on the arc opening of the shroud 12 at the upstream side relative to the arm. The protrusion 14 has a thickness D1 of about 1 mm, a width W1 of about 1 to 2 mm and extends over the entire internal height of the housing or in at least a part thereof in the direction of the disk rotation axis, that is, in the direction perpendicular to the drawing sheet. The enlarged view of the protrusion 14 is as shown in FIG. 9.

FIG. 10 shows a case where the protrusion 14 is not provided. In this case, the width of the arc opening of the shroud 12 widens gradually from width W2. In the case of a shape whose width increases like this, a flow going out of and coming into the disk surface is separated at the arc opening of the shroud to form a large air flow T1 and increase flutter vibration.

On the contrary, as shown in FIG. 11, by a protrusion 14 provided in the arc opening of the shroud 12, the width of the opening of the shroud 12 increases from W2 to W3, but is reduced thereafter to width W4 (W4<W3). As a result, this prevents the flow going out of and coming into the disk surface from being separated at the arc opening of the shroud, and from forming large disturbance of the air flow, and can thereby reduce flutter vibration.

Furthermore, in the case of an apparatus with a plurality of disks placed one atop another, the convex section 17 provided to reduce the size of the gap between the cover and disk or the gap between the housing and disk acts on the disk adjacent to the cover or housing, but the protrusion 14 in this embodiment also acts on the disk not adjacent to the cover or housing, and therefore providing both together makes it possible to effectively reduce flutter vibration from the plurality of stacked disks. The protrusion 14 may be constructed as a component independent of the housing 10 or may also form a monolithic body with the housing 10.

Though the protrusion 14 is provided only at the opening of the shroud on the upstream side of the arm, the protrusion 14 may also be provided at the opening of the shroud on the downstream side of the arm.

Here, an effect of providing the protrusion 14 will be explained using FIG. 12.

The data Y3 in FIG. 12 indicates the flutter amplitude when only the protrusion 14 is provided. Providing the protrusion 14 can reduce the flutter amplitude by approximately 15%. On the other hand, as shown in FIG. 2, the data Y3 indicating the flutter amplitude can be further reduced by 8% by providing the second convex section 17 in addition to the protrusion 14, inclining the upstream part of the convex section in the disk rotational direction by an angle θ6 to the rotational direction with respect to the straight line connecting the disk rotational center and the front end of the convex section on the upstream side in the rotational direction.

As explained above, this embodiment reduces disturbance of the air flow near the upstream of the arm by providing the protrusion 14, and can thereby reduce flutter vibration.

The present invention can simplify manufacturing, reduce the air flow and disturbance of the air flow simultaneously and thereby reduce flutter vibration effectively.

It should be further understood by those skilled in the art that the foregoing description has been made on embodiments of the invention and that various changes and modifications may be made in the invention without departing from the spirit of the invention and the scope of the appended claims.

What is claimed is:

1. A recording apparatus comprising:

at least one disk fixed to a rotation shaft;

a head movable on a surface of said disk to write information onto the disk or read the information recorded on the disk;

an arm supporting the head;

an actuator for moving the arm;

a shroud section of arc-shape extending around a part of an outer periphery of the disk other than the other part thereof facing to a movable range of the arm;

a housing receiving therein said disk, said arm and said actuator; and a cover covering said housing, wherein a first convex section is provided to reduce a size of a gap between said disk surface and said cover or between said disk surface and said housing in an area outside an area in which the arm traverses on said disk, in comparison with the area in which the arm traverses, a second convex section is provided on a part of the first convex section to further reduce the size of the gap between the disk surface and said cover or between said disk surface and said housing in comparison with the first convex section, and said second convex section has an upstream part in a rotational direction of said disk, and the upstream part is inclined in the rotational direction with respect to a straight line connecting a rotational center of said disk and a front end of said a second convex section on an upstream side in the rotational direction.

2. A recording apparatus according to claim 1, wherein an end of said second convex section at a downstream side in the rotational direction of the disk is provided within a range extending by ±30° from a position on an opposite side with respect to said head as seen from said rotation axis.

3. A recording apparatus according to claim 1, wherein said second convex section is provided in a range extending in a reverse rotational direction of said disk from a position distant by 110–170° in the reverse rotational direction from a straight line connecting the rotational shaft of said disk and the rotational shaft of said arm.

4. A recording apparatus according to claim 1, wherein a rear end of said second convex section on the upstream side in the rotational direction is arranged at a radially outer side with respect to the front end of said second convex section on the upstream side in the rotational direction.

5. A recording apparatus according to claim 1, wherein an edge of said second convex section on the upstream side in the rotational direction is inclined in the rotational direction with respect to said straight line in such a manner that an air flow generated on the surface of the disk in accordance with a rotation of the disk is guided toward the outer periphery of the disk by the edge of said second convex section on the upstream side in the rotational direction.

6. A recording apparatus according to claim 1, wherein as seen in a direction parallel to the rotation shaft, the second convex section extends in an angular range in which the shroud also extends around the part of the outer periphery of the disk.

7. A recording apparatus according to claim 1, wherein a protrusion for suppressing separation of air flow is provided in an arc-shaped opening of said shroud section.

8. A recording apparatus according to claim 1, wherein the shroud section comprises a first section where a radial distance between an inner periphery of the shroud section and an outer periphery of the recording disk increases and then decreases downstream relative to a recording disk rotating direction.

9. A recording apparatus according to claim 8, wherein the radial distance increases again in the recording disk rotating direction so that the inner periphery is prevented from facing closely to the outer periphery, after the radial distance between the inner periphery and the outer periphery decreases in the recording disk rotating direction.

10. A recording apparatus comprising:
   at least one disk fixed to a rotation shaft;
   a head movable on a surface of said disk to write information onto the disk or read the information recorded on the disk;
   an arm supporting the head;
   an actuator for moving the arm;
   a shroud section of arc-shape extending around a part of an outer periphery of the disk other than the other part thereof facing to a movable range of the arm;
   a housing receiving therein said disk, said arm and said actuator; and
   a cover covering said housing,
   wherein a convex section is provided at an opposite side, as seen from said rotation axis, with respect to an area in which the arm traverses on said disk to reduce a size of a gap between said disk surface and said cover or between said disk surface and said housing, and
   said convex section has an upstream part in a rotational direction of said disk, and the upstream part is inclined in the rotational direction with respect to a straight line connecting a rotational center of said disk and a front end of said convex section on an upstream side in the rotational direction.

11. A recording apparatus according to claim 10, wherein said convex section is provided in a range extending in a reverse rotational direction of said disk from a position distant by 110–170° in the reverse rotational direction from a straight line connecting the rotational shaft of said disk and the rotational shaft of said arm.

12. A recording apparatus according to claim 10, wherein a rear end of said convex section on the upstream side in the rotational direction is arranged at a radially outer side with respect to said front end.

13. A recording apparatus according to claim 10, wherein the upstream part of the convex section is inclined in the rotational direction with respect to said straight line in such a manner that an air flow generated on the surface of the disk in accordance with a rotation of the disk is guided toward the outer periphery of the disk by the upstream part of the convex section.

14. A recording apparatus according to claim 10, wherein as seen in a direction parallel to the rotation shaft, the convex section extends in an angular range in which the shroud also extends around the part of the outer periphery of the disk.

15. A recording apparatus according to claim 10, wherein a protrusion for suppressing separation of air flow is provided in an arc-shaped opening of said shroud section.

16. A recording apparatus according to claim 10, wherein as seen in a direction parallel to the rotation shaft, the second convex section extends in an angular range in which the shroud also extends around the part of the outer periphery of the disk.

17. A recording apparatus according to claim 16, wherein the radial distance increases again in the recording disk rotating direction so that the inner periphery is prevented from facing closely to the outer periphery, after the radial distance between the inner periphery and the outer periphery decreases in the recording disk rotating direction.

18. A recording apparatus for recording a signal onto a recording disk and/or reading the signal from the recording disk, comprising,
   a rotational shaft for holding thereon the recording disk so that the recording disk is rotatable on a rotational axis of the rotational shaft,
   a head for recording the signal onto the recording disk and/or reading the signal from the recording disk through the head,
   an arm for supporting the head, movable together with the head in a head-arm-assembly moving range over a surface of the recording disk as seen in a direction parallel to the rotational axis in such a manner that the head moves radially along a head moving path over the surface of the recording disk, and
   a cover for covering the surface of the recording disk,
   wherein the cover includes first and second areas each of which is adapted to face the surface of the recording disk at corresponding of the head-arm-assembly moving range, which sides are arranged in a circumferential direction of the recording disk, and a third area which is adapted to face to the surface of the recording disk to form an air-bearing for the surface of the recording disk and is arranged between the first and second areas in the circumferential direction of the recording disk while each of the first and second areas is arranged between the third area and the head-arm-assembly moving range in the circumferential direction of the recording disk, and a distance between the surface of the recording disk and the third area in the direction is smaller than a distance between the surface of the recording disk and each of the first and second areas.

19. A recording apparatus according to claim 18, wherein a boundary between the third area and the second area of downstream side than the first area in a recording disk rotating direction is arranged within a circumferential angular range of ±30° from an imaginary line symmetrical to the head moving path with respect to the rotational axis as seen in the direction.

20. A recording apparatus according to claim 19, wherein the distance between the surface of the recording disk and the third area is prevented from increasing in the disk rotating direction along an imaginary circumferential line on the surface of the recording disk.

21. A recording apparatus according to claim 18, wherein the arm is swingable on a swing axis, and a boundary between the third area and the second area of downstream side than the first area in a recording disk rotating direction is circumferentially distant by 110–170° in a reverse direction of the recording disk rotating direction from a circumferential position of the swing axis.

22. A recording apparatus according to claim 21, wherein the distance between the surface of the recording disk and the third area is prevented from increasing in the disk rotating direction along an imaginary circumferential line on the surface of the recording disk.

23. A recording apparatus according to claim 18, wherein an area of the cover at which the distance between the surface of the recording disk and the cover decreases in a recording disk rotating direction is oblique with respect to a radial direction of the recording disk so that an air flow generated on the surface of the recording disk in accordance with a rotation of the recording disk is effectively guided by the area to an outer periphery of the recording disk.

24. A recording apparatus according to claim 18, wherein a boundary between the third area and the first area of upstream side than the second area in a recording disk rotating direction is oblique with respect to a radial direction of the recording disk so that an air flow generated on the surface of the recording disk in accordance with a rotation of the recording disk is effectively guided by the area to an outer periphery of the recording disk.

* * * * *